US011101935B2

(12) United States Patent
Wang et al.

(10) Patent No.: US 11,101,935 B2
(45) Date of Patent: Aug. 24, 2021

(54) APPARATUS AND METHOD FOR TRANSMITTING PACKET DATA UNITS

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

(21) Appl. No.: 16/496,180

(22) PCT Filed: Dec. 18, 2017

(86) PCT No.: PCT/SE2017/051288
§ 371 (c)(1),
(2) Date: Sep. 20, 2019

(87) PCT Pub. No.: WO2018/174764
PCT Pub. Date: Sep. 27, 2018

(65) Prior Publication Data
US 2020/0169356 A1 May 28, 2020

Related U.S. Application Data

(60) Provisional application No. 62/476,162, filed on Mar. 24, 2017.

(51) Int. Cl.
*H04L 1/18* (2006.01)
*H04L 5/00* (2006.01)

(52) U.S. Cl.
CPC .......... *H04L 1/1812* (2013.01); *H04L 5/0007* (2013.01); *H04L 5/0044* (2013.01)

(58) Field of Classification Search
None
See application file for complete search history.

(56) References Cited

U.S. PATENT DOCUMENTS 9,338,690 B2 * 5/2016 Torsner ................. H04W 28/06
9,544,896 B2 * 1/2017 Kim ...................... H04W 76/28
(Continued)

OTHER PUBLICATIONS

Hiroike, Akira, et al., "Performance evaluation of radio link control protocol using stop-and-wait arq in mobile radio systems", Electronics and Communications in Japan (Part I : Communications) banner, Mar. 31, 1991, pp. 1-3.

(Continued)

*Primary Examiner* — Andrew C Oh
(74) *Attorney, Agent, or Firm* — Murphy, Bilak & Homiller, PLLC

(57) ABSTRACT

A method is provided in a user equipment for retransmitting a packet data unit, PDU, that has previously been transmitted in an uplink to a receiver, the previously transmitted PDU comprising one or more service data units, SDUs. The method comprises receiving an uplink grant for retransmission, wherein the uplink grant for retransmission comprises a time transmission interval, TTI, duration associated therewith. The method comprises determining whether a SDU of the one or more SDUs of the previously transmitted PDU comprises a TTI duration which is not suited to the TTI duration associated with the uplink grant for retransmission, and, if so repackaging the PDU for retransmission.

20 Claims, 7 Drawing Sheets

(56) References Cited

U.S. PATENT DOCUMENTS

| | | | |
|---|---|---|---|
| 10,057,015 B1* | 8/2018 | Naim | H04L 1/08 |
| 2002/0172208 A1* | 11/2002 | Malkamaki | H04L 1/1607 |
| | | | 370/400 |
| 2004/0160925 A1* | 8/2004 | Heo | H04W 36/16 |
| | | | 370/335 |
| 2005/0250486 A1* | 11/2005 | Malm | H04B 1/7115 |
| | | | 455/422.1 |
| 2007/0047452 A1* | 3/2007 | Lohr | H04L 1/1829 |
| | | | 370/242 |
| 2007/0150788 A1* | 6/2007 | Zhuyan | H04L 1/1858 |
| | | | 714/749 |
| 2008/0080424 A1* | 4/2008 | Torsner | H04L 1/0009 |
| | | | 370/330 |
| 2009/0103511 A1* | 4/2009 | Marinier | H04W 28/065 |
| | | | 370/345 |
| 2009/0168920 A1* | 7/2009 | Chen | H04L 1/1851 |
| | | | 375/295 |
| 2009/0190527 A1* | 7/2009 | Marinier | H04L 1/0002 |
| | | | 370/328 |
| 2009/0245203 A1* | 10/2009 | Pani | H04L 1/1671 |
| | | | 370/331 |
| 2009/0257408 A1* | 10/2009 | Zhang | H04L 1/1635 |
| | | | 370/336 |
| 2009/0274171 A1* | 11/2009 | Lucky | H04W 28/02 |
| | | | 370/470 |
| 2009/0307552 A1* | 12/2009 | Harada | H04L 1/0026 |
| | | | 714/748 |
| 2010/0111068 A1* | 5/2010 | Wu | H04L 1/1887 |
| | | | 370/345 |
| 2010/0135220 A1* | 6/2010 | Bergstrom | H04W 28/18 |
| | | | 370/329 |
| 2010/0272078 A1* | 10/2010 | Pani | H04W 28/06 |
| | | | 370/336 |
| 2010/0279634 A1* | 11/2010 | Sagfors | H04L 1/0038 |
| | | | 455/127.1 |
| 2011/0038352 A1* | 2/2011 | Bergman | H04L 1/1822 |
| | | | 370/331 |
| 2011/0044168 A1* | 2/2011 | N Das | H04L 47/14 |
| | | | 370/232 |
| 2011/0047430 A1* | 2/2011 | Feuersanger | H04L 1/1845 |
| | | | 714/748 |
| 2011/0131461 A1* | 6/2011 | Schulz | H04L 1/1819 |
| | | | 714/749 |
| 2011/0138245 A1* | 6/2011 | Haustein | H04L 1/1887 |
| | | | 714/748 |
| 2012/0051308 A1* | 3/2012 | Yajima | H04W 72/1268 |
| | | | 370/329 |
| 2012/0051316 A1* | 3/2012 | Yajima | H04W 72/14 |
| | | | 370/329 |
| 2012/0120886 A1* | 5/2012 | He | H04W 52/12 |
| | | | 370/329 |
| 2012/0155438 A1* | 6/2012 | Shin | H04L 1/1848 |
| | | | 370/336 |
| 2012/0176971 A1* | 7/2012 | Pani | H04L 47/34 |
| | | | 370/328 |
| 2013/0058233 A1* | 3/2013 | Kim | H04L 5/0098 |
| | | | 370/252 |
| 2013/0223412 A1* | 8/2013 | Sambhwani | H04W 28/18 |
| | | | 370/336 |
| 2013/0242824 A1* | 9/2013 | Lee | H04W 72/0446 |
| | | | 370/281 |
| 2013/0242889 A1* | 9/2013 | Khoryaev | H04L 1/1864 |
| | | | 370/329 |
| 2014/0056237 A1* | 2/2014 | Eriksson | H04L 1/0009 |
| | | | 370/329 |
| 2014/0133327 A1* | 5/2014 | Miyauchi | H04L 1/20 |
| | | | 370/252 |
| 2014/0161111 A1* | 6/2014 | Kim | H04W 56/0045 |
| | | | 370/336 |
| 2014/0286240 A1* | 9/2014 | Kim | H04W 76/28 |
| | | | 370/328 |
| 2014/0362832 A1* | 12/2014 | Rudolf | H04L 1/1864 |
| | | | 370/336 |
| 2015/0098371 A1* | 4/2015 | Vajapeyam | H04L 1/1861 |
| | | | 370/280 |
| 2015/0103749 A1* | 4/2015 | Kela | H04L 1/1835 |
| | | | 370/329 |
| 2015/0117287 A1* | 4/2015 | Kim | H04W 24/02 |
| | | | 370/311 |
| 2015/0237644 A1* | 8/2015 | Golitschek Edler von Elbwart | H04W 72/042 |
| | | | 370/329 |
| 2015/0358952 A1* | 12/2015 | Feng | H04L 1/1864 |
| | | | 370/329 |
| 2016/0029245 A1* | 1/2016 | Hong | H04W 28/0278 |
| | | | 370/329 |
| 2016/0073404 A1 | 3/2016 | Vutukuri et al. | |
| 2016/0164643 A1* | 6/2016 | Loehr | H04L 1/1854 |
| | | | 370/336 |
| 2016/0234800 A1* | 8/2016 | Jung | H04L 1/1864 |
| 2016/0295516 A1* | 10/2016 | Su | H04W 28/0221 |
| 2017/0188412 A1* | 6/2017 | Noriega | H04W 88/08 |
| 2017/0223674 A1* | 8/2017 | Dinan | H04L 1/1861 |
| 2017/0317791 A1* | 11/2017 | Wiberg | H04L 1/1861 |
| 2018/0270839 A1* | 9/2018 | Loehr | H04W 72/0446 |
| 2018/0310201 A1* | 10/2018 | Lee | H04L 1/1819 |
| 2018/0375621 A1* | 12/2018 | Turtinen | H04L 1/1816 |
| 2019/0058986 A1* | 2/2019 | Loehr | H04L 1/1825 |
| 2020/0169356 A1* | 5/2020 | Wang | H04L 5/0007 |

OTHER PUBLICATIONS

Li, Jun, et al., "Performance Evaluation of the Radio Link Control Protocol in 3G UMTS", 2003, pp. 1-8.

* cited by examiner

APPARATUS AND METHOD FOR TRANSMITTING PACKET DATA UNITS

TECHNICAL FIELD

The embodiments described herein relate to apparatus and methods for transmitting packet data units (PDUs), and in particular to apparatus and methods for repackaging a PDU in a New Radio (NR) Radio Access Technology (RAT).

BACKGROUND

New Radio (NR) is the name of the new Radio Access Technology (RAT) that will, together with the Long Term Evolution (LTE), form the 5G Radio Access Network (RAN) according to the study item of Release-14 by the $3^{rd}$ Generation Partnership Project (3GPP). In the 5G system LTE and NR will be connected to a new core network, CN, named Next Generation CN (NGCN).

5G NR can be operated from below 1 GHz to around 100 GHz and the carrier bandwidth can vary in a large range, for instance, 10 MHz to 1 GHz, depending on the availability and definition of potential NR carriers. When a User Equipment, UE, receives a grant for uplink (UL) transmission, the Media Access Control (MAC) layer will first perform a Logical Channel Prioritization (LCP).

In other words, when the UE MAC entity sends the data upon reception of an uplink grant, the MAC entity shall perform the Logical Channel Prioritization procedure (LCP) when a new transmission is performed. When the UE MAC entity receives a new uplink grant, the MAC entity shall allocate resources to the logical channels following the priority order determined by LCP procedure. Certain logical channels are better served on some numerologies/Transmission-Time-Interval (TTI) durations than others.

For instance, to make the tight latency requirements of Ultra-Reliable and Low Latency Communications (URLLC), the corresponding logical channels should be served on a short numerology/TTI duration. The LCP procedure sets the priority order for the related logical channels taking into account the mapping of logical channels to one or more numerologies/TTI durations. A single grant carries one TTI duration. However, next time, another grant may carry another different TTI duration. According to latest 3GPP agreements, a single logical channel can be mapped to one or more numerology/TTI durations. Logical channel to numerology/TTI length mapping can be reconfigured via Radio Resource Control (RRC) reconfiguration.

One numerology corresponds to one subcarrier spacing in the frequency domain. By scaling a basic subcarrier spacing, i.e., 15 kHz, by 2N where N is non-negative integer. One TTI duration corresponds to a number of consecutive symbols in the time domain. Different TTI durations can be defined when using a different number of symbols (e.g. corresponding to a mini-slot, one slot or several slots). The combination of one numerology and one TTI duration unambiguously defines how transmission is to be made on the physical layer and the MAC layer.

FIG. 1 illustrates an example of a gNB (i.e. eNB/base station of NR) scheduler in a NR cell with multiple TTI durations. In this example, the physical resources are split into several regions, where each region is assigned with certain TTI duration. The example shows a resource region for a first TTI duration (TTI_duration_1), a resource region for a second TTI duration (TTI_duration_2) and a resource region for a third TTI duration (TTI_duration_3).

For each region, the scheduling interval is determined based on its assigned TTI duration. The scheduling interval in the cell level would be the minimum value of all the configured TTI durations. During each scheduling interval, the scheduler allocates resources to each UE according to a mapping rule between logical channels and TTI durations associated to this UE. The allocated resources/grants associated with a certain TTI duration is taken from the corresponding resource region.

Therefore, at some time, the scheduler may not be able to give resources to a certain UE as expected, since there is no free sources associated with this UE requested TTI duration. It should be avoided that a UE with delay sensitive traffic transmits on a long TTI duration, since a grant with shorter TTI duration may be assigned soon. For a smart implementation, the scheduler may be able to remind/signal UEs of such information in advance. This signaling may be carried, for example, in the downlink (DL) in a MAC control element, or by Radio Resource Control (RRC) signaling, or other signaling such as L1/L2 control signaling.

In NR, the UE MAC entity builds up a MAC Packet Data Unit (PDU) including the data from logical channels with the numerology and TTI duration matching with the received grant. The data from the logical channels comprise respective MAC Service Data Units, MAC SDUs, which are packaged to form a MAC PDU. The MAC PDU is then sent to a receiver, which may be a Hybrid Automated Repeat Request (HARQ) entity. The HARQ transmission may fail to transmit. In this case, a HARQ retransmission is needed to recover failures.

In LTE, the uplink HARQ supports only synchronous operation, which means that the HARQ transmission uses a specific process that can be inferred from the transmission time (SFN and sub-frame number). The retransmission is scheduled at a fixed time interval (i.e., HARQ Round Trip Time, HARQ RTT).

The uplink HARQ further supports two different operation modes: adaptive and non-adaptive. With the adaptive mode, each retransmission may use different Modulation and Coding Scheme (MCS) and Resource Block (RB) assignment in the uplink grant. With the non-adaptive mode, each retransmission uses the same Modulation and Coding Scheme (MCS) and Resource Block (RB) assignments in the uplink grant.

In NR, it is expected that uplink HARQ shall support both the non-adaptive mode and the adaptive mode. In the latter case, the network may assign a different uplink grant associated with a different numerology/TTI duration for retransmissions as the initial transmission. As mentioned earlier, the initial transmitted data unit was built up based on a LCP procedure performed by the UE. The network might have no exact knowledge about what logical channels are included in that transmission. This is particularly true when a Buffer Status Report (BSR) is not sent on time. The BSR, which is sent by a UE in a MAC control element, reports the buffer status (for example the buffer size and priority level) for each logical channel group.

As a baseline, it can be assumed that the network will try to give the same uplink grant (for example in terms of size and numerology/TTI duration) as for the original transmission. However, there may be situations when this is not the case, since there may be no available resources associated with the original TTI duration when the retransmission occurs. In high load situations for example, there may be cases when the network can give a grant on a different TTI length much faster than on the original TTI length, or it may give a smaller grant on the original TTI length and another grant on the original TTI length later on.

Considering that each logical channel, or SDU, is mapped with certain numerologies/TTI durations (one or more than one), it implies that the UE should use only an uplink grant associated with a numerology/TTI duration that is mapped to all logical channels included in the initially transmitted MAC PDU. Then for HARQ retransmissions, if the numerology/TTI duration indicated by the uplink grant is not mapped to one of logical channels included in the initial transmission, the natural option is that the UE should ignore the uplink grant. The reason for this is that the UE may break the QoS for services with delay critical requirements if the grant is on an unsuitable numerology/TTI duration.

This is illustrated in FIG. 2. This illustrates an initial MAC PDU comprising a MAC header 21, a first SDU 22, second SDU 23 and a third SDU 24. The first SDU 22 relates to data from a first logical channel LCH1 (having a TTI interval of 0.25 ms). The second SDU 23 relates to data from a second logical channel LCH2 (also having a TTI interval of 0.25 ms). The third SDU 24 relates to data from a third logical channel LCH3 (having a TTI interval of 0.25 ms, 0.5 ms). LCH3 shows first and second TTI durations—according to 3GPP, each LCP can be mapped to more than one TTI duration. This means that either of the 0.25 ms or 0.5 ms TTI durations for LCH3 may be allowed to transmit data. For each grant, it will carry just one of them.

The data corresponding to the logical channels are taken from respective SDU queues 26, 27, 28 for each respective logical channel LCH1, LCH2, LCH3.

This initial MAC PDU is associated with a uplink grant with a TTI duration of 0.25 ms, and as such the MAC PDU is suited for uplink transmission since this TTI duration of 0.25 ms matches that of each of the first SDU 22, second SDU 23 and third SDU 24.

However, in the example of FIG. 2, if a retransmission at a later time (for example a HARQ retransmission) comprises a uplink grant with TTI duration of 0.5 ms, if the same PDU as above is transmitted in this retransmission, this can result in the first logical LCH1 (SDU 22) and second logical channel LCH 2 (SDU 23) not being mapped with the TTI of duration 0.5 ms of the uplink grant (i.e. since they require TTI durations of 0.25 ms), which may break QoS.

As a consequence, if a UE ignores the uplink grant for retransmission, i.e. in order to avoid the break in QoS mentioned above, this can lead to the following negative impacts.

First, there is a waste of radio resources due to the grant being dropped.

Second, there is a waste of the energy consumption for the g/eNB, when the g/eNB attempts to receive the data for the dropped grant.

SUMMARY

It is an aim of the embodiments described herein to provide a method and apparatus which obviate or reduce at least one or more of the disadvantages mentioned above.

According to a first aspect there is provided a method in a user equipment for retransmitting a packet data unit, PDU, that has previously been transmitted in an uplink to a receiver, the previously transmitted PDU comprising one or more service data units, SDUs. The method comprises receiving an uplink grant for retransmission, wherein the uplink grant for retransmission comprises a time transmission interval, TTI, duration associated therewith. The method comprises determining whether a SDU of the one or more SDUs of the previously transmitted PDU comprises a TTI duration which is not suited to the TTI duration associated with the uplink grant for retransmission; and, if so repackaging the PDU for retransmission.

According to another aspect there is provided a user equipment for retransmitting a packet data unit, PDU, that has previously been transmitted in an uplink to a receiver, the previously transmitted PDU comprising one or more service data units, SDUs. The user equipment is adapted to receive an uplink grant for retransmission, wherein the uplink grant for retransmission comprises a time transmission interval, TTI, duration associated therewith. The user equipment is adapted to determine whether a SDU of the one or more SDUs of the previously transmitted PDU comprises a TTI duration which is not suited to the TTI duration associated with the uplink grant for retransmission; and, if so repackage the PDU for retransmission.

According to another aspect, there is provided a method in network node. The method comprises receiving a retransmitted PDU comprising one or more SDUs. The method comprises receiving information indicating whether each SDU of the PDU corresponds to a SDU from a previous transmission of the PDU. The method comprises using the received information to combine retransmitted SDUs with previously received SDUs in a soft combining process, and using the received information to treat newly received SDUs as new SDUs in a soft combining process.

According to another aspect, there is provided a network node. The network node is adapted to receive a retransmitted PDU comprising one or more SDUs.

The network node is adapted to receive information indicating whether each SDU of the PDU corresponds to a SDU from a previous transmission of the PDU. The network node is adapted to use the received information to combine retransmitted SDUs with previously received SDUs in a soft combining process, and use the received information to treat newly received SDUs as new SDUs in a soft combining process.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
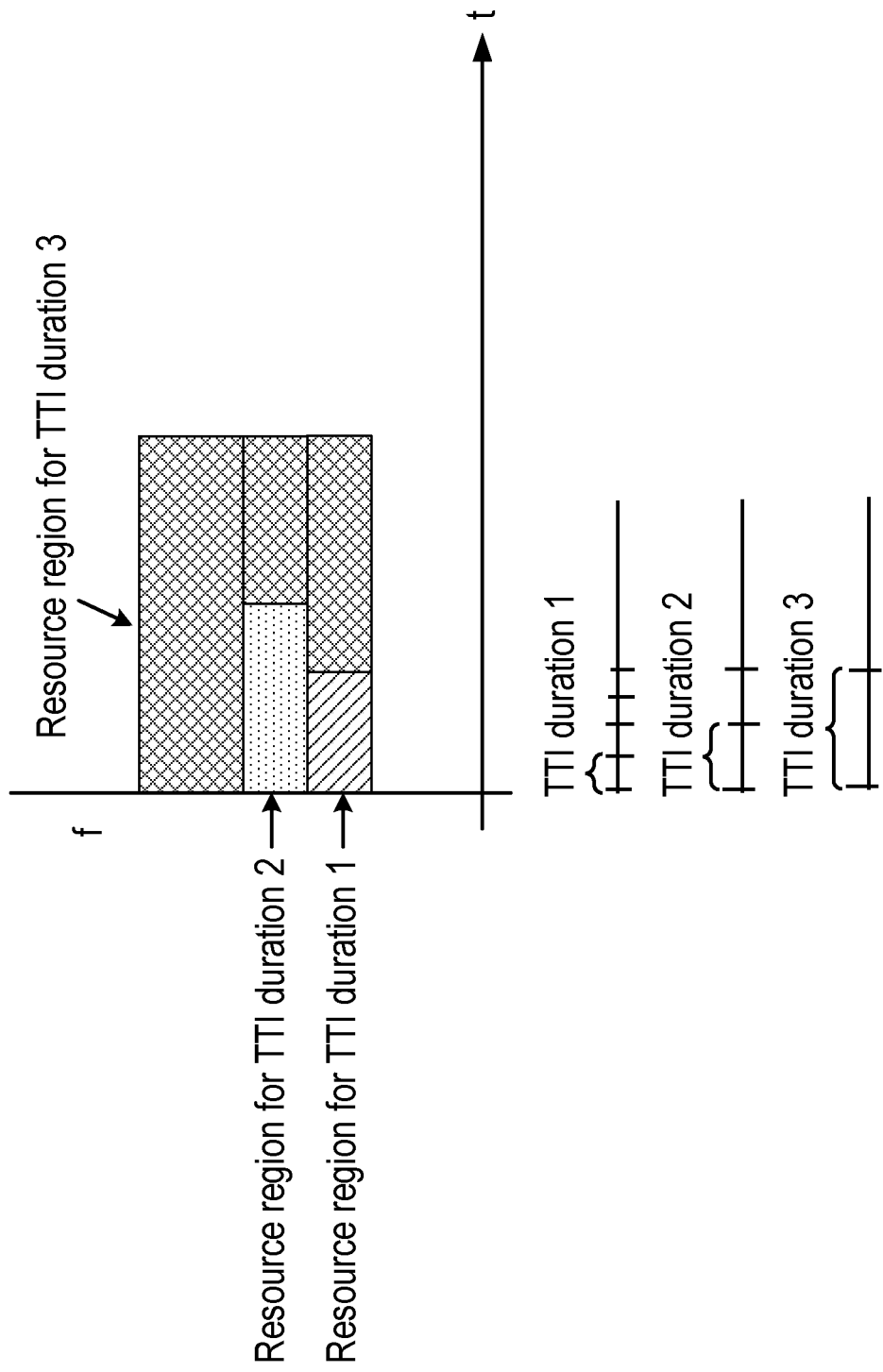
FIG. 1 shows an example of a scheduler with support of multiple transmission time interval, TTI, durations.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile device, communication device, IoT device, M2M device, wireless communication device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the general terms "terminal device", "communication device" and "wireless communication device" are used in the following description, and it will be appreciated that such a device may or may not be 'mobile' in the sense that it is carried by a user. Instead, the term "terminal device" (and the alternative general terms set out above) encompasses any device that is capable of communicating with communication networks that operate according to one or more mobile communication standards, such as the Global System for Mobile communications, GSM, UMTS, Long-Term Evolution, LTE, 5G, New Radio etc. A UE may comprise a Universal Subscription Identity Module (USIM) on a smart-card or implemented directly in the UE, e.g., as software or as an integrated circuit. The operations described herein may be partly or fully implemented in the USIM or outside of the USIM.

The embodiments described herein relate to an apparatus and method, and in particular a UE, for example a UE MAC entity, which is adapted to repack a packet data unit, PDU, for example a MAC PDU in NR upon reception of a uplink grant associated with an unsuitable numerology/TTI duration, e.g. for a retransmission, such as a HARQ retransmission.

Figure 3:
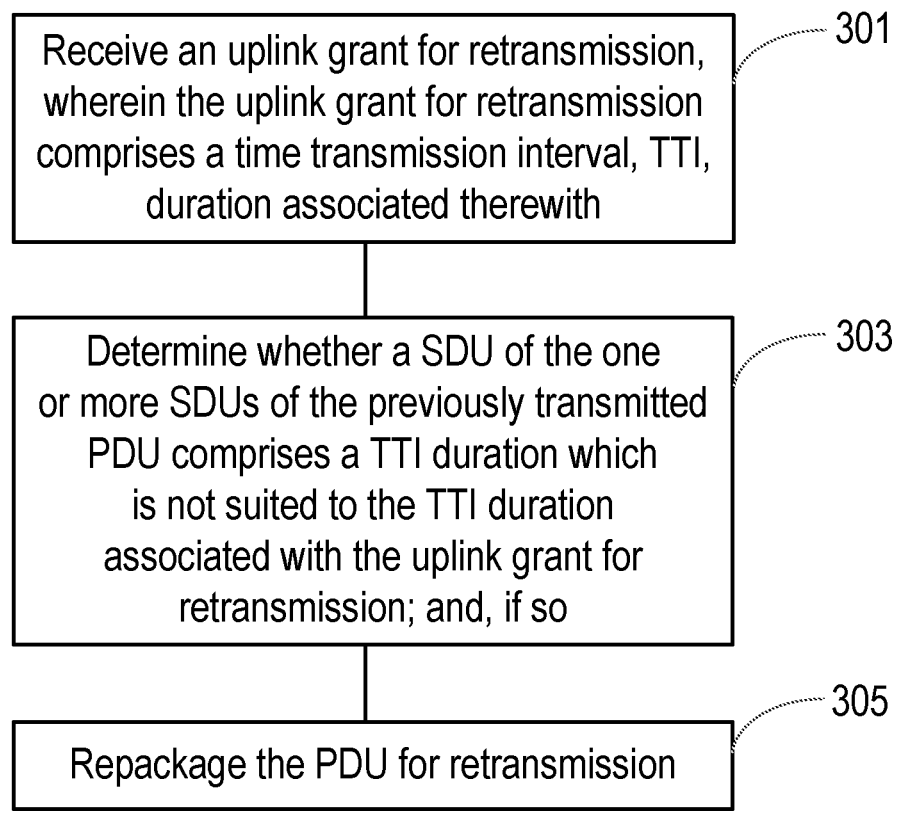
FIG. 3 shows an example of a method according to an embodiment.

FIG. 3 shows an example of a method in a user equipment according to an embodiment, for retransmitting a packet data unit, PDU, that has previously been transmitted in an uplink grant to a receiver, the previously transmitted PDU comprising one or more service data units, SDUs.

The method comprises receiving an uplink grant for retransmission, wherein the uplink grant for retransmission comprises a time transmission interval, TTI, duration associated therewith, step 301.

The method comprises determining whether a SDU of the one or more SDUs of the previously transmitted PDU comprises a TTI duration which is not suited to the TTI duration associated with the uplink grant for retransmission, step 303, and, if so, repackaging the PDU for retransmission, step 305.

It is noted that, in the embodiments described herein, a TTI duration relates to the duration of the data transmission associated with an uplink grant. As such, the term TTI duration, as used herein, is a transmission duration which is used as a metric, for example how many OFDM symbols the data transmission spans.

In one example, determining whether the TTI duration is suited may comprise comparing whether a TTI duration of a SDU for transmission matches the TTI duration allocated in the uplink grant for retransmission.

In another example, determining whether the TTI duration is suited comprises comparing whether a TTI duration of a SDU mapped for transmission corresponds to a TTI duration carried by the uplink grant for retransmission.

The step of repacking may comprise, for example, extracting any SDUs that comprise a TTI duration not suited to the TTI duration of the uplink grant for retransmission.

It is noted that any extracted SDUs may be added back to corresponding SDU queues according to their logical channel identifiers, IDs.

Thus, in embodiments described herein, a UE or MAC entity can be adapted to repack a MAC PDU, by extracting the MAC SDUs that do not match the numerology/TTI duration of a received uplink grant (e.g. relating to a retransmission), and add the extracted SDUs back to the corresponding MAC SDU queues according to their logical channel identifiers, IDs. In this way, the uplink grant then has free bits left.

In one embodiment a UE or MAC entity has various options, for example three options, for using up those free bits, i.e. created by extraction of any unsuitable SDUs (logical channels) from the PDU:

1) According to one option, the UE may use data from other logical channels (e.g. other SDUs, if available). Then, the free bits in the uplink grant can be treated as a separate new grant. The UE MAC entity performs a LCP procedure for other logical channels (than the ones included for the retransmission). The MAC entity then creates a separate MAC PDU. The network, NW, should be informed of this, so that the network can process both MAC PDUs separately.

Thus, in one example, the method in a UE may comprise replacing an extracted SDU with an SDU having a TTI duration which matches the TTI duration of the uplink grant relating to retransmission.

2) According to another option, the UE inserts padding bits into the free bits created by the extraction of one or more SDUs (logical channels).

Thus, in one example the method comprises replacing an extracted SDU with padding bits.

3) According to another option, nothing is transmitted in the free bits created by the extraction of one or more SDUs (logical channels).

Thus, in one example the method comprises not transmitting any data in any free bits formed by an extracted SDU.

In one example, the network determines which option that the UE MAC entity shall take. In another example, the selection is made elsewhere, for example by the UE itself. In such an example, the method performed at the UE comprises selecting one of the options described above. In such an example, the UE may inform the network of its selection.

It is noted that in an alternative embodiment, a UE may be configured to use a specific option, without having a selection. The specific option may be under network control. In such an embodiment, the option to be performed by the UE is selected by the network.

According to one embodiment, for all the above options, the actual used bits or position in the grant are signaled to the network HARQ receiver entity so that the soft combing procedure will only consider the actual retransmitted bits. For a method performed at the UE, the method may therefore comprise signaling to the receiver that the PDU for retransmission has been repackaged.

The signaling may include information identifying the region of the uplink grant that is used for retransmission.

The signaling may include information identifying the region of the uplink grant that is treated as a new uplink grant being used for data transfer from one or more other SDUs.

The services (SDUs) are mapped to the right numerologies/TTI durations so that its QoS requirements are better fulfilled. In one example, the services with delay critical requirements will not be mapped to long TTI durations.

According to some examples, a UE signals to the network using a physical uplink control channel, PUCCH, or a L2 message, or a MAC-CE message.

Figure 2:
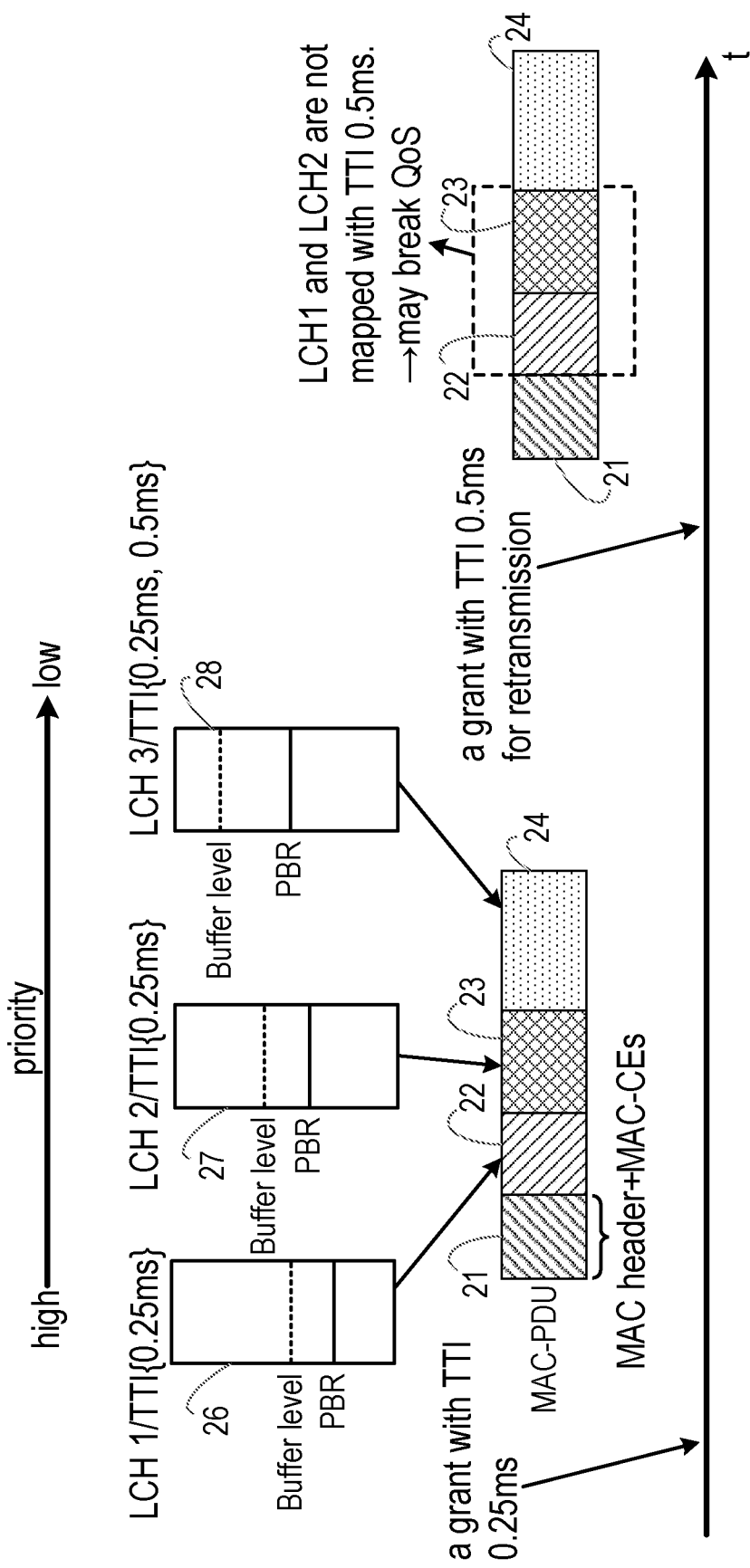
FIG. 2 shows an example of PDU transmission and retransmission according to the prior art.
Figure 4:
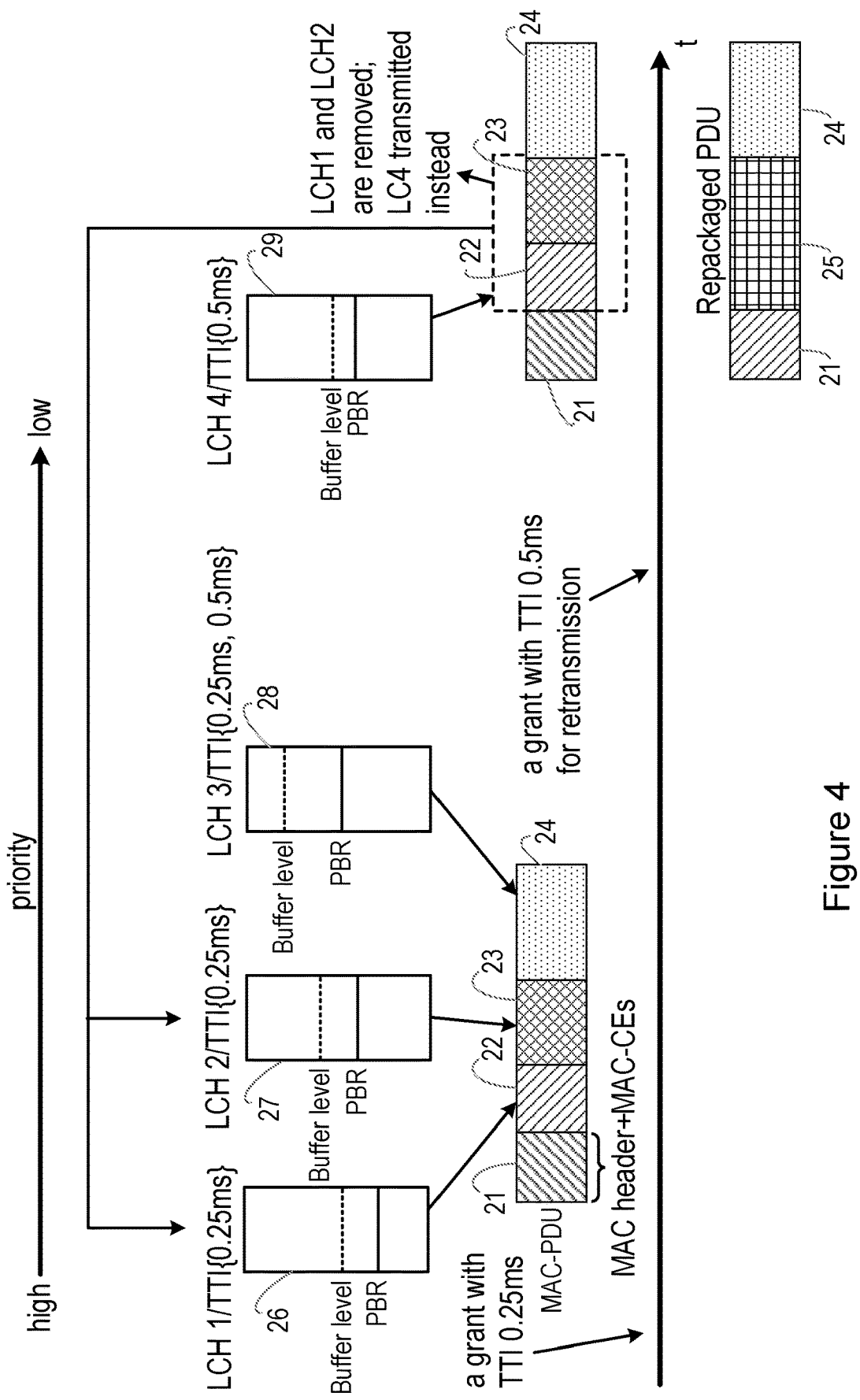
FIG. 4 shows an example of PDU transmission and retransmission according to an embodiment.

FIG. 4 shows an example similar to FIG. 2, in which an initial MAC PDU comprises a MAC header 21, a first SDU 22, second SDU 23 and a third SDU 24. The first SDU 22 relates to data from a first logical channel LCH1 (having a TTI interval of 0.25 ms). The second SDU 23 relates to data from a second logical channel LCH2 (also having a TTI interval of 0.25 ms). The third SDU 24 relates to data from a third logical channel LCH3 (having a TTI interval of 0.25 ms, 0.5 ms, either of which may be used with as a TTI duration for transmission).

This initial MAC PDU is associated with a uplink grant with a TTI duration of 0.25 ms, and as such the initial MAC PDU is suited for uplink transmission since this TTI duration of 0.25 ms matches that of each of the first SDU 22, second SDU 23 and third SDU 24.

However, in the example of FIG. 4, if a retransmission (for example a HARQ retransmission) comprises a uplink grant with TTI duration of 0.5 ms, if the same PDU as above was transmitted in this retransmission, then as explained above in FIG. 2, this would result in the first logical LCH1 (SDU 22) and second logical channel LCH 2 (SDU 23) not being mapped with the TTI of duration 0.5 ms of the uplink grant, which may break QoS.

However, according to an embodiment as shown in FIG. 4, since the grant for retransmission carries a different TTI duration than the initial transmission. The UE MAC entity checks if this TTI suits logical channels, e.g. all logical channels, included in the initial transmission. The data (SDUs) from the logical channels that are not mapped with this TTI duration will be removed from the retransmitted MAC PDU, for example as described above with reference to FIG. 3, and re-entered into the MAC SDU queues (26, 27, 28). Thus, in this example, the data or SDUs corresponding to the logical channels LCH1 and LCH2 (SDUs 22 and 23 in this example) will be removed.

To use up the free bits, the UE MAC entity has various options as noted above, including:

1) transmission of the data from other logical channels that are mapped with the TTI in the retransmission grant.

2) Padding bits to use up the free resource

3) No transmission for those free bits

In the example of FIG. 4, the first option is adopted, henceforth, some data from other logical channels are allowed to be transmitted with the free bits in the HARQ retransmission. FIG. 4 shows data from logical channel LCH4 (SDU 25), having a suitable TTI duration of 0.5 ms, being used to fill part or whole of the free bits created by the extraction of SDUs 22 and 23. This is illustrated in FIG. 4 by the "repackaged PDU".

As mentioned above, according to some embodiments, the UE signals information relating to the MAC repacking to the network. The signaling may comprise of the information shown below:

1) The region of the grant that is used for retransmission (the region corresponding to SDU 24 in FIG. 4).

2) The region of the grant that is treated as a separate "new grant", and can be used for data transfer from other logical channels (the region corresponding to SDU 25 in FIG. 4). The indication of the new transmission uses this region.

The UE may signal the network, for example, via a Physical Uplink Control Channel, PUCCH, type control channel, or via other L2 messages, such as a MAC-CE.

The network HARQ receiver extracts the data received from the grant region used for HARQ retransmission, and performs the soft combining with the data part received from the initial transmissions.

Figure 5:
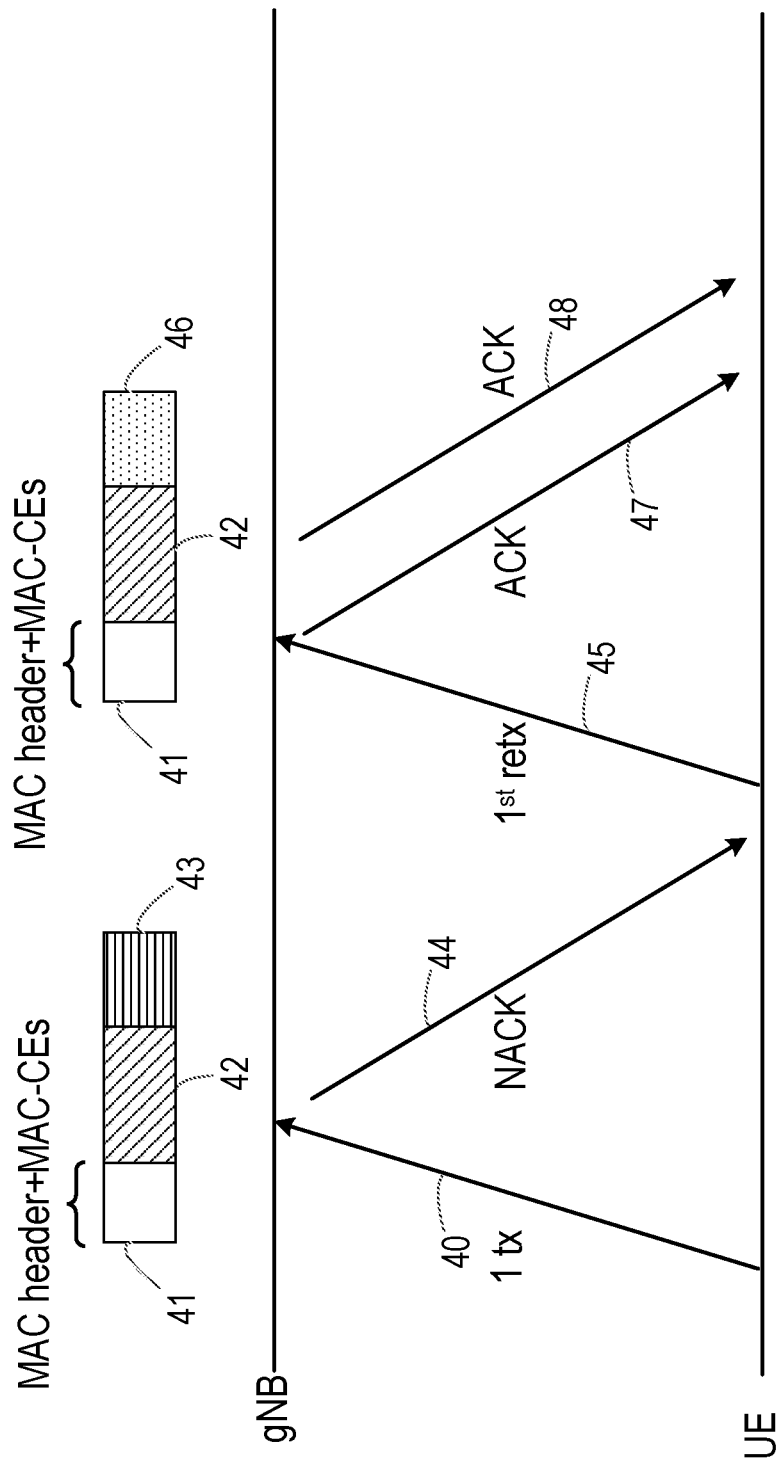
FIG. 5 shows a further example of PDU transmission according to an embodiment.

FIG. 5 shows an example of the HARQ process. During an initial transmission 40 a PDU is transmitted comprising a MAC header 41, and data represented for example as a first SDU 42 and a second SDU 43. Since the data has not been fully decoded, the HARQ receiver (e.g., gNB at the network side) sends a NACK signal 44 to the UE, requesting a retransmission.

In this example there is only one part of the data from the initial PDU (the SDU labelled 42) that is retransmitted since the SDU 43 is not mapped with the TTI duration in the uplink grant relating to retransmission. Instead, in the first retransmission attempt 45, another part of data is transmitted with the free resources in the retransmission grant (the part illustrated by SDU 46). The HARQ receiver (e.g., gNB at the network side) performs HARQ reception for the HARQ retransmission. The parts labelled as SDUs 42 are combined to achieve a successful reception, resulting in a first acknowledgement signal 47 being transmitted to the UE. The data labelled as SDU 46 is processed in a separated HARQ process, as the new data. After the process, the HARQ receiver sends a second HARQ acknowledgement, ACK signal 48, for the SDU 46 separately. The data corresponding to the SDU 43 of the initial transmission is removed from the soft buffer. It will be transmitted later as it has been re-entered into the MAC SDU queues by the UE MAC entity.

Figure 6:
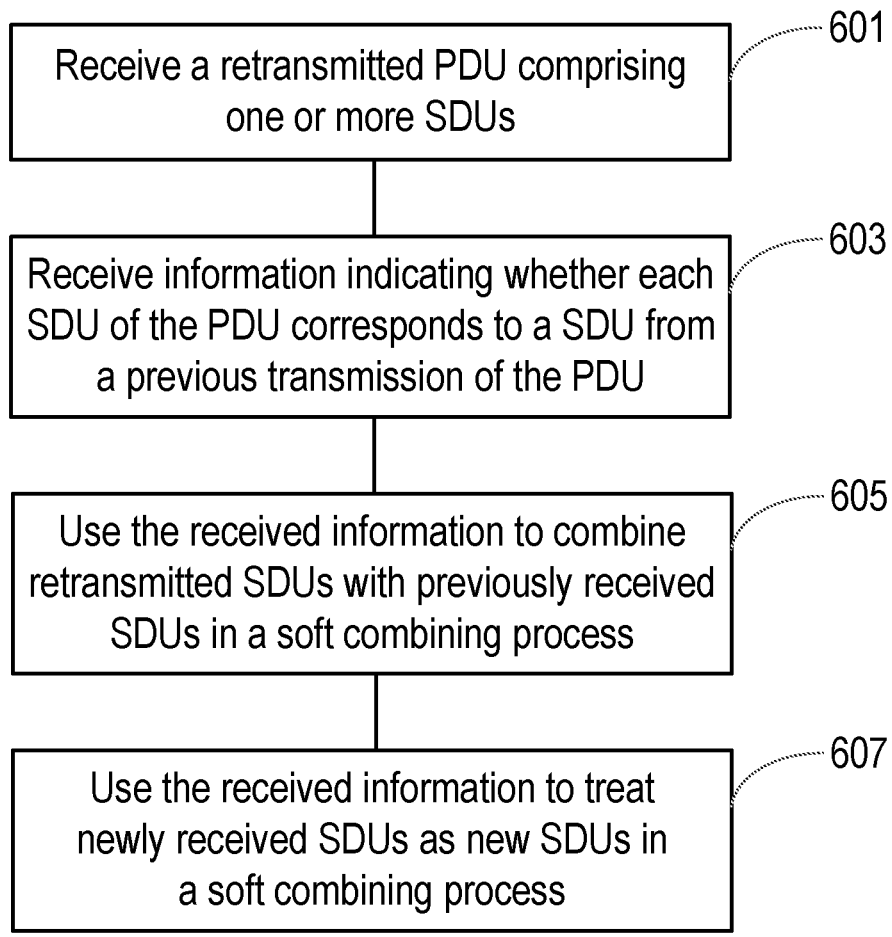
FIG. 6 shows an example of a method according to an embodiment.

FIG. 6 shows a method in a network node, e.g. a gNB, according to another embodiment. The method comprises receiving a retransmitted PDU comprising one or more SDUs, step 601. The method comprises receiving information indicating whether each SDU of the PDU corresponds to a SDU from a previous transmission of the PDU, step 603. The method comprises using the received information to combine retransmitted SDUs with previously received SDUs in a soft combining process, step 605, and using the received information to treat newly received SDUs as new SDUs in a soft combining process, step 607.

The retransmitted PDU may be part of a HARQ process.

Figure 7:
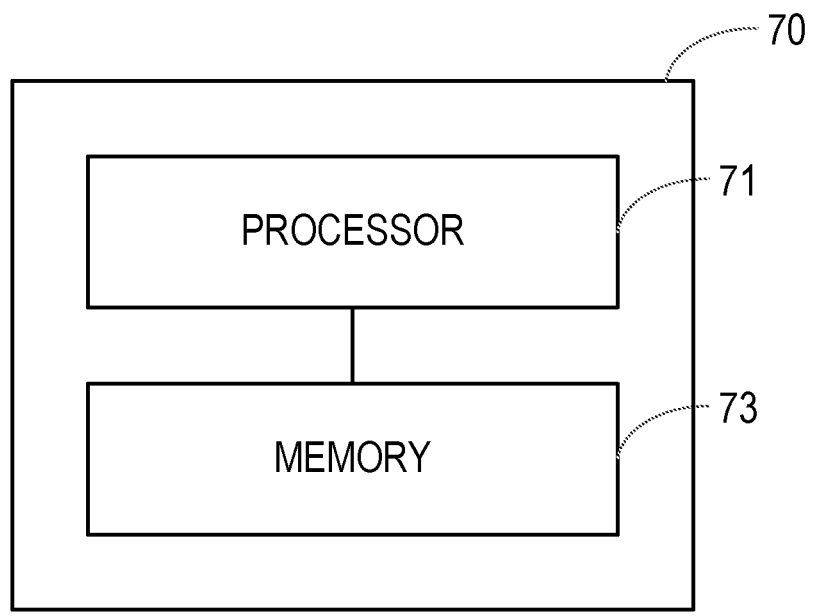
FIG. 7 shows an example of a user equipment according to an embodiment.

FIG. 7 shows an example of a user equipment 70 according to an embodiment, for retransmitting a packet data unit, PDU, that has previously been transmitted in an uplink to a receiver, the previously transmitted PDU comprising one or more service data units, SDUs. The user equipment comprises a processor 71 and a memory 73, said memory 73 containing instructions executable by said processor 71. The user equipment 70 is operative to receive an uplink grant for retransmission, wherein the uplink grant for retransmission comprises a time transmission interval, TTI, duration associated therewith. The user equipment 70 is operative to determine whether a SDU of the one or more SDUs of the previously transmitted PDU comprises a TTI duration which is not suited to the TTI duration associated with the uplink grant for retransmission; and, if so repackage the PDU for retransmission.

The user equipment may be further operative to perform the methods as described herein, and as defined in appended claims 2 to 16.

According to another embodiment, there is provided a user equipment for retransmitting a packet data unit, PDU, that has previously been transmitted in an uplink to a receiver, the previously transmitted PDU comprising one or more service data units, SDUs. The user equipment is adapted to: receive an uplink grant for retransmission, wherein the uplink grant for retransmission comprises a time transmission interval, TTI, duration associated therewith; determine whether a SDU of the one or more SDUs of the previously transmitted PDU comprises a TTI duration which is not suited to the TTI duration associated with the uplink grant for retransmission; and, if so repackage the PDU for retransmission.

Such a user equipment may be adapted to perform the methods described herein, and as defined in appended claims 2 to 16.

Figure 8:
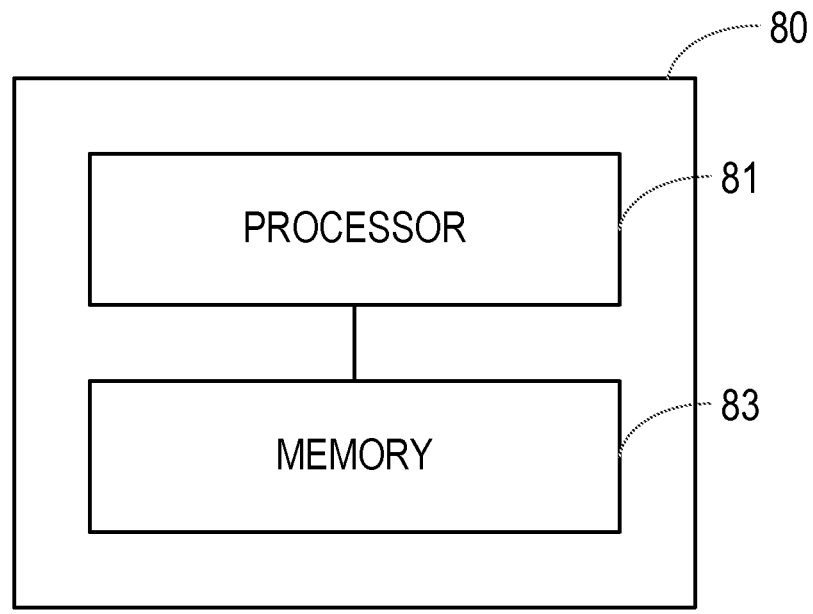
FIG. 8 shows an example of a network node according to an embodiment.

FIG. 8 shows an example of a network node according to an embodiment. The network node comprises a processor 81 and a memory 83, said memory 83 containing instructions executable by said processor 81. The network node is operative to receive a retransmitted PDU comprising one or more SDUs. The network node 80 is operative to receive information indicating whether each SDU of the PDU corresponds to a SDU from a previous transmission of the PDU. The network node 80 is operative to use the received information to combine retransmitted SDUs with previously received SDUs in a soft combining process. The network node is operative to use the received information to treat newly received SDUs as new SDUs in a soft combining process.

According to another embodiment, there is provided a network node adapted to: receive a retransmitted PDU comprising one or more SDUs; receive information indicating whether each SDU of the PDU corresponds to a SDU from a previous transmission of the PDU; and use the received information to combine retransmitted SDUs with previously received SDUs in a soft combining process, and use the received information to treat newly received SDUs as new SDUs in a soft combining process.

It should be noted that the above-mentioned embodiments illustrate rather than limit the invention, and that those skilled in the art will be able to design many alternative embodiments without departing from the scope of the embodiments described above. The word "comprising" does not exclude the presence of elements or steps other than those listed in a claim, "a" or "an" does not exclude a plurality, and a single processor or other unit may fulfil the functions of several units recited in the statements. Any reference signs in the statements shall not be construed so as to limit their scope.

The invention claimed is:

1. A method in a user equipment for retransmitting a packet data unit (PDU) that has previously been transmitted in an uplink to a receiver, the previously transmitted PDU comprising one or more service data units (SDUs), the method comprising:
   receiving an uplink grant for retransmission, wherein the uplink grant for retransmission comprises a time transmission interval (TTI) duration associated therewith;
   determining whether a SDU of the one or more SDUs of the previously transmitted PDU comprises a TTI duration which is not suited to the TTI duration associated with the uplink grant for retransmission; and, if so repackaging the PDU for retransmission.

2. The method of claim 1, wherein determining whether the TTI duration is suited comprises comparing whether a TTI duration of a SDU for transmission matches the TTI duration allocated in the uplink grant for retransmission.

3. The method of claim 1, wherein determining whether the TTI duration is suited comprises comparing whether a TTI duration of a SDU mapped for transmission corresponds to a TTI duration carried by the uplink grant for retransmission.

4. The method of claim 1, wherein the step of repacking comprises extracting any SDUs that comprise a TTI duration not suited to the TTI duration of the uplink grant for retransmission.

5. The method of claim 4, further comprising, adding any extracted SDUs back to corresponding SDU queues according to their logical channel identifiers (IDs).

6. The method of claim 4, further comprising:
   replacing an extracted SDU with an SDU having a TTI duration which matches the TTI duration of the uplink grant relating to retransmission.

7. The method of claim 4, further comprising:
   replacing an extracted SDU with padding bits.

8. The method of claim 4, further comprising:
   not transmitting any data in any free bits formed by an extracted SDU.

9. The method of claim 4, further comprising performing a step selected from the following:
   replacing an extracted SDU with an SDU having a TTI duration which matches the TTI duration of the uplink grant relating to retransmission;
   replacing an extracted SDU with padding bits; and
   not transmitting any data in any free bits formed by an extracted SDU.

10. The method of claim 9, wherein the step to be performed by the UE is selected by the network.

11. The method of claim 1 comprising:
signaling to the receiver that the PDU for retransmission has been repackaged.

12. The method of claim 11, wherein the signaling includes information identifying the region of the uplink grant that is used for retransmission.

13. The method of claim 1, further comprising:
signaling to the receiver that the PDU for retransmission has been repackaged.

14. The method of claim 13, wherein the signaling includes information identifying the region of the uplink grant that is used for retransmission.

15. The method of claim 13, wherein the signaling includes information identifying the region of the uplink grant that is treated as a new uplink grant being used for data transfer from one or more other SDUs.

16. A user equipment for retransmitting a packet data unit (PDU) that has previously been transmitted in an uplink to a receiver, the previously transmitted PDU comprising one or more service data units (SDUs), the user equipment comprising a processor and a memory, said memory containing instructions executable by said processor, whereby said user equipment is operative to:
receive an uplink grant for retransmission, wherein the uplink grant for retransmission comprises a time transmission interval (TTI) duration associated therewith;
determine whether a SDU of the one or more SDUs of the previously transmitted PDU comprises a TTI duration which is not suited to the TTI duration associated with the uplink grant for retransmission; and, if so
repackage the PDU for retransmission.

17. The user equipment of claim 16, wherein the user equipment is operative to determine whether the TTI duration is suited by comparing whether a TTI duration of a SDU for transmission matches the TTI duration allocated in the uplink grant for retransmission.

18. The user equipment of claim 16, wherein the user equipment is operative to determine whether the TTI duration is suited by comparing whether a TTI duration of a SDU mapped for transmission corresponds to a TTI duration carried by the uplink grant for retransmission.

19. The user equipment of claim 16, wherein the user equipment is operative to, as part of repackaging the PDU for retransmission, extract any SDUs that comprise a TTI duration not suited to the TTI duration of the uplink grant for retransmission.

20. The user equipment of claim 19, wherein the user equipment is operative to add any extracted SDUs back to corresponding SDU queues according to their logical channel identifiers (IDs).

* * * * *